US009413647B2

(12) United States Patent
Schatzmayr

(10) Patent No.: US 9,413,647 B2
(45) Date of Patent: Aug. 9, 2016

(54) MULTI-PROTOCOL LABEL SWITCHING (MPLS) FUNCTIONALITY IN A COMMUNICATIONS NETWORK BETWEEN A FIRST NODE AND A SECOND NODE VIA A WIRELESS CONNECTION

(75) Inventor: Rainer Schatzmayr, Bonn (DE)

(73) Assignee: DEUTSCHE TELEKOM AG, Bonn (DE)

( * ) Notice: Subject to any disclaimer, the term of this patent is extended or adjusted under 35 U.S.C. 154(b) by 296 days.

(21) Appl. No.: 13/580,676

(22) PCT Filed: Feb. 17, 2011

(86) PCT No.: PCT/EP2011/000757
§ 371 (c)(1),
(2), (4) Date: Aug. 23, 2012

(87) PCT Pub. No.: WO2011/103982
PCT Pub. Date: Sep. 1, 2011

(65) Prior Publication Data
US 2012/0314659 A1  Dec. 13, 2012

Related U.S. Application Data

(60) Provisional application No. 61/307,925, filed on Feb. 25, 2010.

(30) Foreign Application Priority Data

Feb. 25, 2010  (EP) .................................. 10001936

(51) Int. Cl.
*H04W 4/00* (2009.01)
*H04L 12/723* (2013.01)
*H04W 76/02* (2009.01)
(52) U.S. Cl.
CPC ............. *H04L 45/50* (2013.01); *H04W 76/022* (2013.01)

(58) Field of Classification Search
None
See application file for complete search history.

(56) References Cited

U.S. PATENT DOCUMENTS

2003/0142643 A1  7/2003  Yang et al.
2009/0016282 A1*  1/2009  Gasparroni et al. .......... 370/329
(Continued)

FOREIGN PATENT DOCUMENTS

EP         1653675 A1 *  5/2006  ............. H04L 12/56
WO     WO 2009024508 A1   2/2009
WO     WO 2009115132 A1   9/2009

OTHER PUBLICATIONS

Chia, et al., The next challenge for cellular networks: backhaul, IEEE Microwave Magazine, Aug. 1, 2009 IEEEService Center, Piscataway, NJ, US—ISSN 1527-3342, vol. 10, Nr:5, pp. 54-66.
Shneyderman et al., Mobile VPNs for next generation GPRS and UMTS networks, White Paper Lucent Technologies, Jan. 1, 2000, pp. 1-15.

(Continued)

*Primary Examiner* — Rhonda Murphy
(74) *Attorney, Agent, or Firm* — Leydig, Voit & Mayer, Ltd.

(57) ABSTRACT

A system for providing a Multi-Protocol Label Switching (MPLS) functionality in a communications network between a first node and a second node via a wireless connection between a first wireless interface and a second wireless interface includes an enhanced eNodeB of a Radio Access Network (RAN) of an Evolved Packet System (EPS) network, configured to provide the first wireless interface; and a user equipment connected to a second node, configured to provide the second wireless interface. The enhanced eNodeB is a Label Edge Router (LER) of a MPLS domain.

13 Claims, 2 Drawing Sheets

(56) References Cited

U.S. PATENT DOCUMENTS

| | | | | |
|---|---|---|---|---|
| 2009/0296637 | A1* | 12/2009 | Fischer | 370/328 |
| 2010/0020733 | A1 | 1/2010 | Hartman | |
| 2011/0058479 | A1* | 3/2011 | Chowdhury | H04L 45/05 370/237 |
| 2011/0188857 | A1* | 8/2011 | Zheng | H04L 12/6418 398/45 |

OTHER PUBLICATIONS

European Patent Office, International Search Report in International Patent Application No. PCT/EP2008/000757 (Apr. 6, 2011).

European Patent Office, Extended European Search Report in European Patent Application No. 10 00 1936 (Jul. 23, 2010).

* cited by examiner

MULTI-PROTOCOL LABEL SWITCHING (MPLS) FUNCTIONALITY IN A COMMUNICATIONS NETWORK BETWEEN A FIRST NODE AND A SECOND NODE VIA A WIRELESS CONNECTION

CROSS-REFERENCE TO RELATED APPLICATIONS

This patent application is a national stage entry under 35 U.S.C. §371 of International Application No. PCT/EP2011/000757, filed Feb. 17, 2011, and claims priority to European Patent Application No. EP 10001936.3, filed Feb. 25, 2010, and U.S. Provisional Patent Application No. 61/307,925, filed Feb. 25, 2010. The International Application was published in English on Sep. 1, 2011 as WO 2011/103982.

FIELD

The present invention relates to a system for providing a Multi-Protocol Label Switching (MPLS) functionality in a communications network between a first node and a second node. The invention also relates to a method for providing a Multi-Protocol Label Switching (MPLS) functionality in a communications network between a first node and a second node. Further, the invention relates to an enhanced eNodeB of a Radio Access Network (RAN) of an Evolved Packet System (EPS) network, a program and a computer program product, the enhanced eNodeB providing a Multi-Protocol Label Switching (MPLS) functionality in a communications network between a first node and a second node.

BACKGROUND

Multi-Protocol Label Switching (MPLS) networks are known to provide Ethernet connectivity or backhauling network signaling and traffic in Radio Access Networks (RAN). Traditionally, Ethernet connectivity services are provided by Multi-Protocol Label Switching (MPLS) network operators to connect Ethernet networks located at different sites. The current model for providing Ethernet connectivity service is to use Multi-Protocol Label Switching (MPLS) technology, where Multi-Protocol Label Switching (MPLS) specific equipment is installed at the sites that should be connected. These remote devices are then connected via a wired connection to additional network operator equipment that implements a Multi-Protocol Label Switching (MPLS) network to provide a transparent Ethernet connectivity between the sites where the remote devices are installed.

Multi-Protocol Label Switching (MPLS) networks are also used to connect the eNodeB infrastructure of mobile network operators operating Evolved Packet Systems (EPS) or Long Term Evolution (LTE) networks. In this scheme, the Multi-Protocol Label Switching (MPLS) network provides a connection between the remote sites where the mobile network operator equipment is located and the central office site.

A drawback of known Evolved Packet System (EPS) infrastructure such as eNodeB systems is that no transparent Ethernet connectivity service can be provided via the Long Term Evolution (LTE) air interface.

SUMMARY

In an embodiment, the present invention provides a system for providing a Multi-Protocol Label Switching (MPLS) functionality in a communications network between a first node and a second node via a wireless connection between a first wireless interface and a second wireless interface. The system includes an enhanced eNodeB of a Radio Access Network (RAN) of an Evolved Packet System (EPS) network, configured to provide the first wireless interface; and a user equipment connected to a second node, configured to provide the second wireless interface. The enhanced eNodeB is a Label Edge Router (LER) of a MPLS domain.

DETAILED DESCRIPTION

Figure 1:
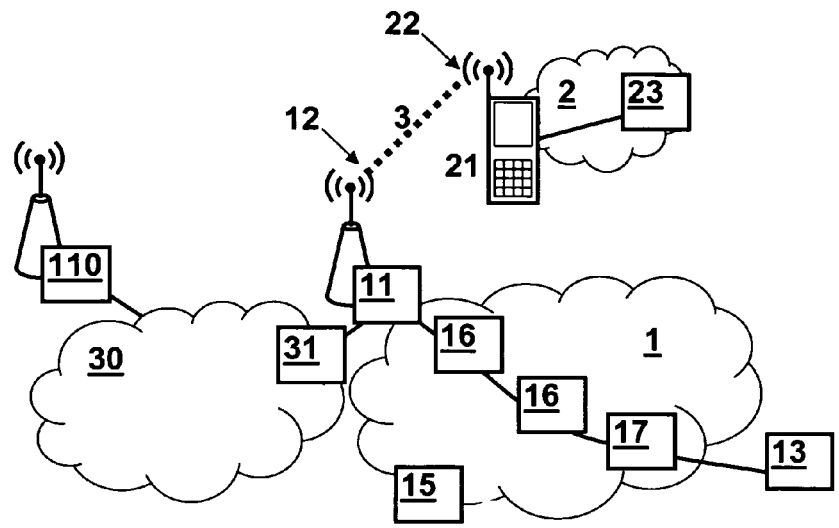
FIG. 1 shows schematically a configuration of a system connecting a first node and a second node via a wireless connection according to the present invention providing a Multi-Protocol Label Switching (MPLS) functionality.

In an embodiment, the present invention is provides a system for realizing a Multi-Protocol Label Switching (MPLS) functionality in a communications network between a first node and a second node via a wireless connection between a first wireless interface and a second wireless interface within the framework of a Radio Access Network (RAN) of an Evolved Packet System (EPS).

In an embodiment, the present invention provides a system for providing a Multi-Protocol Label Switching (MPLS) functionality in a communications network between a first node and a second node via a wireless connection between a first wireless interface and a second wireless interface, wherein the system comprises an enhanced eNodeB of a Radio Access Network (RAN) of an Evolved Packet System (EPS) network, the enhanced eNodeB providing the first wireless interface, and wherein the system comprises a user equipment connected to the second node, the user equipment providing the second wireless interface, wherein preferably the enhanced eNodeB is a Label Edge Router (LER) of a Multi-Protocol Label Switching (MPLS) domain.

It is thereby advantageously possible to effectively deploy Ethernet connectivity services by means of enhanced eNodeB devices. The reach of Ethernet services provided by Multi-Protocol Label Switching (MPLS) networks can thereby be extended beyond the site where mobile network equipment is located, namely via the wireless radio interface until the remote site demanding Ethernet connectivity service. Historically, mobile (cellular) networks have not been used to provide Ethernet connectivity services due to a lack of bandwidth and quality of the air interface (resulting in a lack of guaranteed quality of service) and the incompatibility of the infrastructure operated by mobile operators with Ethernet connectivity services. The deployment of Long Term Evolution (LTE) networks (Evolved Packet Systems (EPS)) provides an infrastructure where the current bandwidth limitations for the delivery of Ethernet connectivity services are solved. Long Term Evolution (LTE) networks provide a network with bandwidth of many megabytes per second and also a set of Quality-of-Service (QoS) parameters that allow the provisioning of a wireless connection via the air interface to a remote site with the quality needed for Ethernet connectivity. The present invention removes the present incompatibility between the infrastructure of the Radio Access Network (RAN) operated by the mobile operator and the needs of Ethernet connectivity services. In case that the enhanced eNodeB device is a Label Edge Router (LER) of a Multi- Protocol Label Switching (MPLS) domain, it is advantageously possible according to the present invention to provide for the possibility of defining different levels of data transmission quality (quality of service, QoS).

According to the present invention, it is preferred that a Multi-Protocol Label Switching (MPLS) tunnel is created between the first node and the second node using the wireless connection.

Thereby, it is advantageously possible to provide an effective routing through the Multi-Protocol Label Switching (MPLS) domain of the communications network. A Multi-Protocol Label Switching (MPLS) tunnel provides for an accelerated data transmission compared to IP routing (without using label switching). Additionally, it is advantageous that an enhanced level of security can be achieved by using such a Multi-Protocol Label Switching (MPLS) tunnel as the path (or route) of the packets transmitted through the network can be predefined by means of the Multi-Protocol Label Switching (MPLS) protocol. It is furthermore preferred that the Multi-Protocol Label Switching (MPLS) tunnel is a bidirectional Multi-Protocol Label Switching (MPLS) tunnel.

Furthermore, it is preferred that the enhanced eNodeB is a Label Edge Router (LER) of a Multi-Protocol Label Switching (MPLS) domain.

It is thereby advantageously possible to provide for the possibility of defining different levels of data transmission quality (quality of service, QoS).

Furthermore, it is preferred according to the present invention that the user equipment is provided such as to encapsulate Ethernet data frames into Long Term Evolution (LTE) PDCP protocol data units, preferably to encapsulate Ethernet data frames directly into Long Term Evolution (LTE) PDCP protocol data units. According to this embodiment, it is advantageously possible to avoid an Internet Protocol (IP) connectivity between any of the involved parties or nodes, particularly not between the enhanced eNodeB and the remote equipment over the Long Term Evolution (LTE) radio connection. Thereby, it is advantageously possible to greatly reduce the overhead protocol handling (required by the use of Internet Protocol (IP) connectivity).

According to a further preferred embodiment of the present invention, the Radio Access Network (RAN) is a Radio Access Network (RAN) according to the Long Term Evolution (LTE) standard. Thereby, it is advantageously possible to provide a bandwidth through the wireless connection of at least a few hundred Kilobits per second or preferably of at least a few Megabits per second.

It is furthermore preferred according to the present invention that a reserved Long Term Evolution (LTE) bearer is assigned to be used by the enhanced eNodeB of the Radio Access Network (RAN) to communicate with the user equipment via the wireless connection, wherein preferably other eNodeB nodes of the Radio Access Network (RAN) only use other Long Term Evolution (LTE) bearers.

It is thereby advantageously possible to reserve one or a plurality of specific Long Term Evolution (LTE) bearers for the communication between the first node and the second node via the wireless connection. The term Long Term Evolution (LTE) bearer can mean a specific reserved physical radio resource (e.g. a specific spectral range or a plurality of spectral bands) and/or a specific logical resource such as a bearer ID (or a plurality of bearer IDs).

According to the present invention, it is furthermore preferred that an Ethernet connectivity service is provided between the first node and the second node, preferably using an exclusive Ethernet connectivity specific Long Term Evolution (LTE) bearer.

It is thereby advantageously possible that no handover is possible between the enhanced eNodeB and other eNodeB nodes of the Radio Access Network (RAN), thus providing an enhanced stability to the communication between the first node and the second node via the wireless connection.

In an embodiment, the present invention provides a method for providing a Multi-Protocol Label Switching (MPLS) functionality in a communications network between a first node and a second node via a wireless connection between a first wireless interface and a second wireless interface, wherein an enhanced eNodeB of a Radio Access Network (RAN) of an Evolved Packet System (EPS) network provides the first wireless interface, and wherein a user equipment provides the second wireless interface, wherein the method comprises the step of creating a Multi-Protocol Label Switching (MPLS) tunnel between the first node and the second node using the wireless connection.

Thereby, it is advantageously possible to deploy, e.g., Ethernet connectivity services by means of enhanced eNodeB devices that are part of a Multi-Protocol Label Switching (MPLS) network. The reach of Ethernet services provided by Multi-Protocol Label Switching (MPLS) networks can thereby be extended beyond the site where mobile network equipment is located, namely via the wireless radio interface until the remote site demanding Ethernet connectivity service. Thereby, it is preferred that the enhanced eNodeB devices are Label Edge Routers (LER) of a Multi-Protocol Label Switching (MPLS) domain.

According to a preferred embodiment of the present invention, a reserved Long Term Evolution (LTE) bearer is assigned to be used by the enhanced eNodeB of the Radio Access Network (RAN) to communicate with the user equipment via the wireless connection, wherein other eNodeB nodes (110) of the Radio Access Network (RAN) preferably only use other Long Term Evolution (LTE) bearers.

Furthermore, it is preferred that the method comprises the step of providing an Ethernet connectivity service between the first node and the second node.

In an embodiment, the present invention provides an enhanced eNodeB of a Radio Access Network (RAN) of an Evolved Packet System (EPS) network, the enhanced eNodeB providing a Multi-Protocol Label Switching (MPLS) functionality in a communications network between a first node and a second node via a wireless connection between a first wireless interface and a second wireless interface, wherein the enhanced eNodeB provides the first wireless interface, and wherein a user equipment provides the second wireless interface and is connected to the second node, wherein the enhanced eNodeB is a Label Edge Router (LER) of a Multi-Protocol Label Switching (MPLS) domain.

Furthermore, it is preferred according to the present invention that the enhanced eNodeB is a Label Edge Router (LER) of a Multi-Protocol Label Switching (MPLS) domain.

Another object of the present invention is a program comprising a computer readable program code for controlling a system or an enhanced eNodeB for providing a Multi-Protocol Label Switching (MPLS) functionality in a communications network between a first node and a second node via a wireless connection according to the present invention.

In an embodiment, the present invention provides a computer program product comprising the inventive computer readable program code for controlling a system or an enhanced eNodeB according to the present invention.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described of illustrated herein.

In FIG. 1 a configuration of a system connecting a first node 13 and a second node 23 via a wireless connection 3 according to the present invention is schematically represented. According to the present invention, a Multi-Protocol Label Switching (MPLS) functionality is provided between the first node 13 and the second node 23 or—in other words— the first and second node 13, 23 are connected using a Multi-Protocol Label Switching (MPLS) network. Thereby, it is possible according to the present invention to deliver an Ethernet connectivity service between the first and second node 13, 23 by enhancing the Multi-Protocol Label Switching (MPLS) network with a wireless connection. According to the present invention, this wireless connection is based on a standard technology or a Radio Access Network (RAN) of an Evolved Packet System (EPS). Preferably, the wireless connection 3 is based on standard Long Term Evolution (LTE) technology. This means that the second node 23 is located in a remote site and is connected wirelessly by means of an enhanced eNodeB of the Radio Access Network (RAN). The Radio Access Network (RAN) is assigned to reference numeral 30. An enhanced eNodeB 11 is assigned to reference numeral 11. The wireless connection 3 is realized between a first wireless interface 12 of the enhanced eNodeB 11 and a second wireless interface 22 of a specific device 21 which is hereinafter also called mobile station 21 or user equipment 21. The wirelessly connected remote site is hereinafter also called second network area and assigned to reference numeral 2. A first network area 1 comprises a Multi-Protocol Label Switching (MPLS) network providing an Ethernet connectivity service between the first and second node 13, 23. The first and second network area 1, 2 are connected via the wireless connection 3.

The invention provides an extension to the current infrastructure of a Multi-Protocol Label Switching (MPLS) network. A Multi-Protocol Label Switching (MPLS) network usually comprises Provider Nodes or Label Switch Routers which are assigned to reference numeral 16, and Provider Edge Nodes or Label Edge Routers 17.

According to the present invention, the enhanced eNodeB 11—which is connected to the Radio Access Network (RAN) 30—serves as a Label Edge Router (LER) within the Multi-Protocol Label Switching (MPLS) network of the first network area 1. This means that the enhanced eNodeB 11 extends the Multi-Protocol Label Switching (MPLS) network beyond the mobile station 21 reaching the second node 23 in the second network area 2. The enhanced eNodeB actively participates in the Multi-Protocol Label Switching (MPLS) network by managing Multi-Protocol Label Switching (MPLS) labels with other Multi-Protocol Label Switching (MPLS) nodes and by allocating Multi-Protocol Label Switching (MPLS) labels to connections of specific remote sites. The mobile station 21 (or specific device 21) is able to encapsulate Ethernet frames and forward them via the wireless connection 3 to the enhanced eNodeB 11.

The Multi-Protocol Label Switching (MPLS) network comprises also an operator unit (or Multi-Protocol Label Switching (MPLS) management equipment) which is assigned to reference numeral 15. By means of the operator unit 15, all the nodes of the Multi-Protocol Label Switching (MPLS) network are managed and controlled. This means that the enhanced eNodeB 11 is (with respect to its Multi-Protocol Label Switching (MPLS) network behavior or parameters) also controlled by the Multi-Protocol Label Switching (MPLS) operator unit 15. The control of the wireless connection 3 of the enhanced eNodeB 11 is realized by an equipment of the Radio Access Network (RAN) 30, i.e. a mobile operator equipment assigned to reference numeral 31. Examples of such an equipment is the Home Subscriber Server (HSS), the Mobility Management Entity (MME) or the Policy Charging Rule Function (PCRF). The mobile operator equipment 31 is located at a site of the mobile operator operating the Radio Access Network (RAN) 30 whereas the operator unit 15 located at the Multi-Protocol Label Switching (MPLS) network operator site.

According to the present invention, it is possible that also the first node 13 is located in a remote site and connected wirelessly (by means of another wireless connection) but for the sake of simplicity, this case is not represented in FIG. 1.

According to the present invention, the enhanced eNodeB 11 uses a reserved Long Term Evolution (LTE) bearer assigned to be used for the communication with the user equipment 21 (or mobile station 21) via the wireless connection 3. A reserved Long Term Evolution (LTE) bearer is a Long Term Evolution (LTE) bearer that is not used by other eNodeB nodes 110 present in the Radio Access Network (RAN). Such an assigned bearer is preferably an exclusive Ethernet connectivity specific Long Term Evolution (LTE) bearer, i.e. only used for the transmission of data connected with the Ethernet connectivity service between the enhanced eNodeB 11 and the user equipment 21.

According to the present invention, the user equipment 21 (or remote equipment 21) is connected via a wireless interface, e.g. a Long Term Evolution (LTE) wireless interface, to the mobile operator's network infrastructure, i.e. to the enhanced eNodeB 11. The control plane of the remote equipment 21 is the same as for Long Term Evolution (LTE) connections/devices. A connection to the wireless operator infrastructure is established when the remote equipment 21 is turned on or restarted. According to the present invention, the user plane at the remote equipment 21 is able to encapsulate Ethernet frames into Long Term Evolution (LTE) PDCP protocol data units, and forward them over the air interfaces 12, 22 of the wireless connection 3, i.e. to the (Ethernet connectivity service) enhanced eNodeB via RLC (Radio Link Control), MAC (Medium Access Control) and PHY (Physical Layer) protocols. The forwarding of Ethernet frames is made via a communication channel established between the remote equipment 21 and the enhanced eNodeB 11 (base station according to the Long Term Evolution (LTE) standard). Data transfer via the radio or wireless interface 3 preferably follows the Long Term Evolution (LTE) Uu interface standard. The protocol stack for the Long Term Evolution (LTE) control plane conforms to the protocol stacks defined by 3GPP.

Furthermore according to the present invention, the enhanced eNodeB 11 is enhanced (compared to a conventional eNodeB node 110 according to the 3GPP specified functionality and protocols for the eNodeB) by means of two sets of enhancements in order to allow the integration of Ethernet connectivity service enhanced eNodeB 11 within the Multi-Protocol Label Switching (MPLS) network. These enhancements can be implemented in the existing eNodeB, or by additional system deployed at the same site as the eNodeB. The first set of enhancements refers to the extension of a 3GPP conform eNodeB (not enhanced) to terminate the Long Term Evolution (LTE) bearers at the site of the eNodeB. Thereby, an enhanced eNodeB 11 according to the present invention avoids that the traffic from a specific bearer received via the radio interface is forwarded to the core sites of the Radio Access Network (RAN) 30 for further processing. This can be achieved by extending the capability of a 3GPP conform eNodeB, or by deploying appropriate equipment at the same site as the eNodeB. In both cases, the node supporting the Ethernet connectivity service is called the (Ethernet connectivity service) enhanced eNodeB 11. The (Ethernet connectivity service) enhanced eNodeB 11 has the same interfaces as specified by 3GPP for the interfaces (called S1-MME) between an eNodeB and the Mobility Management Entity (MME), the same interfaces specified by 3GPP for the interfaces (called S11) between a Signaling Gateway (S-GW) and the Mobility Management Entity (MME), and also the same interface (called Gx) between the Packet Data Network Gateway (PDN-GW) and the Policy Charging Rule Function (PCRF). The second set of enhancements to the (Ethernet connectivity service) enhanced eNodeB 11 is in the area of Multi-Protocol Label Switching (MPLS) support. These enhancements consist in support of protocols and mechanisms needed to implement Multi-Protocol Label Switching (MPLS) networks. The (Ethernet connectivity service) enhanced eNodeB 11 supports Internet Protocol (IP) routing protocols as OSPF (Open Shortest Path First), IS-IS (Intermediate System to Intermediate System Protocol), and BGP (Border Gateway Protocol). The (Ethernet connectivity service) enhanced eNodeB can handle Label Distribution Protocols in order to participate in a Multi-Protocol Label Switching (MPLS) network acting as a Label Edge Router (LER). It assigns Multi-Protocol Label Switching (MPLS) labels to the Ethernet frames received via the communication channel established to the remote equipment 21 over the Long Term Evolution (LTE) air interface (or wireless connection 3). This second set of enhancements can be achieved by extending the capability of a 3GPP conform eNodeB, or by deploying appropriate equipment at the same site as the eNodeB.

According to the present invention, it is furthermore preferred that the Long Term Evolution (LTE) infrastructure of the Radio Access Network (RAN) is enhanced such that Ethernet connectivity services can be provided. Thereby, it is preferred according to the present invention that an (Ethernet connectivity service) specific Long Term Evolution (LTE) bearer is signaled to the remote equipment 21 (or user equipment 21) and to the (Ethernet connectivity service) enhanced eNodeB 11. This specific Long Term Evolution (LTE) bearer terminates the connection at the enhanced eNodeB 11 site and does not forward the encapsulated Ethernet frames to core sites of the Radio Access Network (RAN) 30. Other eNodeB 110 (not enhanced eNodeB 11) that do not support Ethernet connectivity services are preferably not able to establish this specific bearer.

The Home Subscriber Server (HSS) and Mobility Management Entity (MME) as well as the (Ethernet connectivity service) enhanced eNodeB 11 do not provide support for handover of such wireless connections 3 to other eNodeB nodes 110. If the remote equipment 21 intends to connect to another enhanced eNodeB, it needs to be disconnected from the enhanced eNodeB 11 and reconnected to a new enhanced eNodeB 11.

The Policy Charging Rule Function (PCRF) of the Radio Access Network (RAN) 30 provides the parameters to the (Ethernet connectivity service) enhanced eNodeB 11 that corresponds to the Ethernet connectivity service. These parameters define the priority of the Ethernet connectivity service, and the bandwidth to be allocated for the Ethernet connectivity service.

Figure 2:
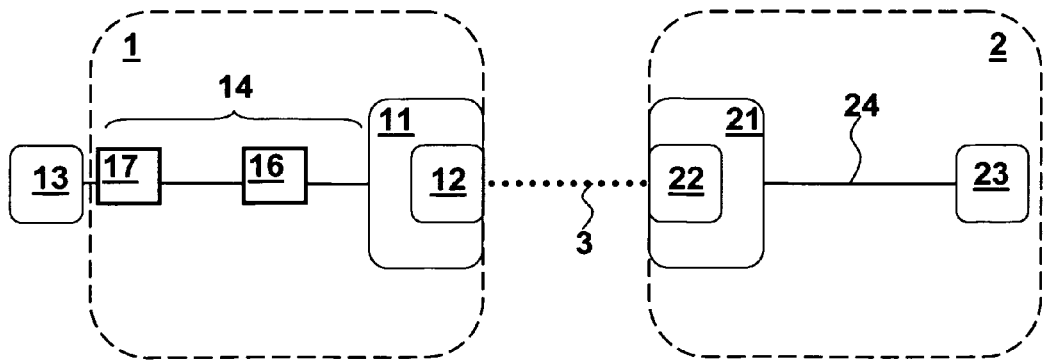
FIG. 2 shows schematically another representation of the connection between the first and second node.

FIG. 2 shows schematically another representation of the connection between the first and second node 13, 23 via the wireless connection 3. The connection is preferably an Ethernet connection between the first and second node 13, 23. A Multi-Protocol Label Switching (MPLS) tunnel defines a path through the Multi-Protocol Label Switching (MPLS) network in the first network area 1. Between the first node 13 and the enhanced eNodeB 11, preferably an Ethernet connection 14 is established through the Multi-Protocol Label Switching (MPLS) network comprising network elements 16 and 17. In the second network area 2, an Ethernet connection 24 is established between the remote equipment 21 and the second node 23.

Figure 3:
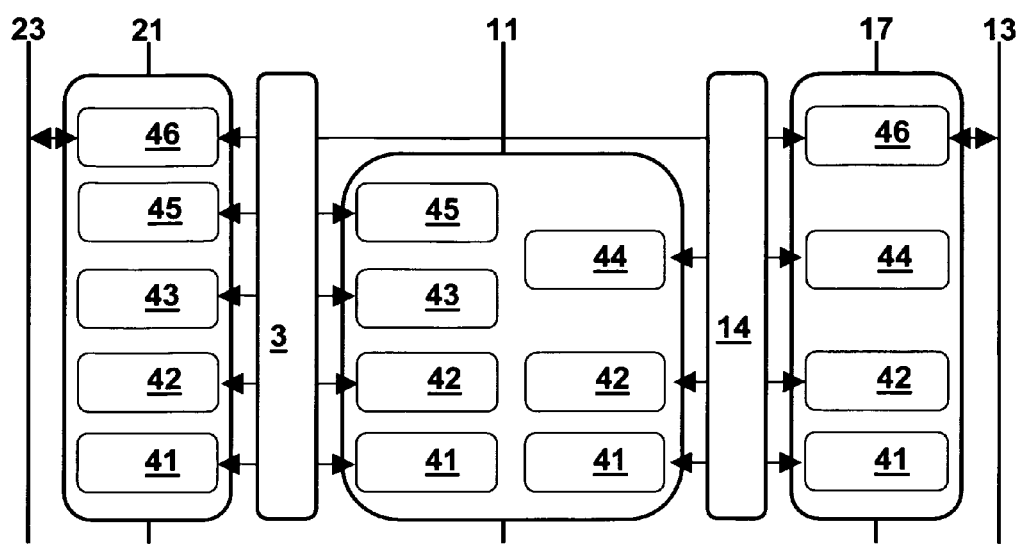
FIG. 3 shows schematically a protocol stack of a system according to the present invention.

FIG. 3 shows schematically the protocol stack of the second node 23, the remote equipment 21, the enhanced eNodeB 11, the Label Edge Router (LER) 17 of the Multi-Protocol Label Switching (MPLS) network and the first node 13. Reference numeral 41 refers to the PHY layer, i.e. the physical layer of the OSI reference model. Reference numeral 42 refers to the MAC layer, i.e. the Medium Access Connection layer of the OSI reference model. Reference numeral 43 refers to the RLC layer, i.e. the Radio Link Control. Reference numeral 44 refers to the Multi-Protocol Label Switching (MPLS) layer. Reference numeral 45 refers to the Packet Data Convergence Protocol (PDCP). Reference numeral 46 refers to an Ethernet connection. It is clearly visible that both the first node 13 and the second node 23 provided with an Ethernet connectivity service via a transparent Ethernet connection between the remote equipment 21 and the Label Edge Router (LER) 17 of the Multi-Protocol Label Switching (MPLS) network via the wireless connection 3. Especially, there is no Internet Protocol (IP) connectivity between any of the involved parties or nodes, particularly not between the enhanced eNodeB 11 and the remote equipment 21 over the Long Term Evolution (LTE) radio connection. Thereby, it is advantageously possible to greatly reduce the overhead signalization and overhead protocol handling required when using such an Internet Protocol (IP) connectivity.

The invention claimed is:

1. A system for providing a Multi-Protocol Label Switching (MPLS) functionality in a communications network between a first node and a remotely located second node via a wireless connection between a first wireless interface and a second wireless interface, the system comprising:
   an enhanced eNodeB of a Radio Access Network (RAN) of an Evolved Packet System (EPS) network, configured to provide the first wireless interface; and
   a user equipment connected to the second node, configured to provide the second wireless interface;

wherein the enhanced eNodeB is part of a first network area and the second node is part of a second network area, wherein the first network area is connected to the second network area via the wireless connection and the enhanced eNodeB is configured to extend MPLS functionality to the second node via the wireless connection and the user equipment;

wherein the enhanced eNodeB is a Label Edge Router (LER) of a MPLS domain; and wherein the user equipment is further configured to encapsulate Ethernet data frames into Long Term Evolution (LTE) Packet Data Convergence Protocol (PDCP) data units.

2. The system according to claim 1, wherein a MPLS tunnel is created using the wireless connection between the first node and the second node.

3. The system according to claim 1, wherein the RAN is configured according to the Long Term Evolution (LTE) standard.

4. The system according to claim 1, wherein a reserved Long Term Evolution (LTE) bearer is assigned to be used by the enhanced eNodeB of the RAN to communicate with the user equipment via the wireless connection.

5. The system according to claim 4, wherein other eNodeB nodes of the RAN only use other LTE bearers.

6. The system according to claim 1, wherein an Ethernet connectivity service is provided between the first node and the second node.

7. The system according to claim 6, wherein the Ethernet connectivity service is provided using an exclusive Ethernet connectivity-specific Long Term Evolution (LTE) bearer.

8. A method for providing a Multi-Protocol Label Switching (MPLS) functionality in a communications network between a first node and a remotely located second node via a wireless connection between a first wireless interface and a second wireless interface, wherein an enhanced eNodeB of a Radio Access Network (RAN) of an Evolved Packet System (EPS) network provides the first wireless interface, and wherein a user equipment provides the second wireless interface, the method comprising:

creating a Multi-Protocol Label Switching (MPLS) tunnel between the first node and the second node using the wireless connection;

wherein the enhanced eNodeB is part of a first network area and the second node is part of a second network area, wherein the first network area is connected to the second network area via the wireless connection and the enhanced eNodeB is configured to extend MPLS functionality to the second node via the wireless connection and the user equipment;

wherein the user equipment encapsulates Ethernet data frames into Long Term Evolution (LTE) Packet Data Convergence Protocol (PDCP) data units and forwards the encapsulated Ethernet data frames via the wireless connection to the enhanced eNodeB; and wherein the enhanced eNodeB acts as a Label Edge Router (LER) which assigns MPLS labels to the Ethernet frames received via the wireless connection.

9. The method according to claim 8, wherein a reserved Long Term Evolution (LTE) bearer is assigned to be used by the enhanced eNodeB of the RAN to communicate with the user equipment via the wireless connection.

10. The method according to claim 9, wherein other eNodeB nodes of the RAN only use other Long Term Evolution (LTE) bearers.

11. The method according to claim 8, further comprising:
providing an Ethernet connectivity service between the first node and the second node.

12. An enhanced eNodeB of a Radio Access Network (RAN) of an Evolved Packet System (EPS) network, the enhanced eNodeB providing a Multi-Protocol Label Switching (MPLS) functionality in a communications network between a first node and a remotely located second node via a wireless connection between a first wireless interface and a second wireless interface, the enhanced eNodeB comprising:

the first wireless interface;

wherein the enhanced eNodeB is part of a first network area and the second node is part of a second network area, wherein the first network area is connected to the second network area via the wireless connection and the enhanced eNodeB is configured to extend MPLS functionality to the second node via the wireless connection and the user equipment;

wherein the enhanced eNodeB is a Label Edge Router (LER) of a MPLS domain; and wherein the enhanced eNodeB is configured to terminate Long Term Evolution (LTE) bearers at the site of the enhanced eNodeB.

13. A non-transitory computer-readable medium having computer-executable instructions stored thereon for providing a Multi-Protocol Label Switching (MPLS) functionality in a communications network between a first node and a remotely located second node via a wireless connection between a first wireless interface and a second wireless interface, wherein an enhanced eNodeB of a Radio Access Network (RAN) of an Evolved Packet System (EPS) network provides the first wireless interface, and wherein a user equipment provides the second wireless interface, the computer-executable instructions, when executed by a processor, causing the following steps to be performed:

creating a Multi-Protocol Label Switching (MPLS) tunnel between the first node and the second node using the wireless connection;

wherein the enhanced eNodeB is part of a first network area and the second node is part of a second network area, wherein the first network area is connected to the second network area via the wireless connection and the enhanced eNodeB is configured to extend MPLS functionality to the second node via the wireless connection and the user equipment;

wherein the user equipment encapsulates Ethernet data frames into Long Term Evolution (LTE) Packet Data Convergence Protocol (PDCP) data units and forwards the encapsulated Ethernet data frames via the wireless connection to the enhanced eNodeB; and wherein the enhanced eNodeB acts as a Label Edge Router (LER) which assigns MPLS labels to the Ethernet frames received via the wireless connection.

* * * * *